United States Patent

[11] 3,560,651

[72] Inventor Charles T. Roth
Webster, N.Y.
[21] Appl. No. 681,542
[22] Filed Nov. 8, 1967
[45] Patented Feb. 2, 1971
[73] Assignee Xerox Corporation
Rochester, N.Y.
a corporation of New York

[54] MECHANICAL FEEDBACK FOR FACSIMILE SCANNING SYSTEM
8 Claims, 3 Drawing Figs.

[52] U.S. Cl. .......... 178/7.6, 178/6, 178/7.1
[51] Int. Cl. .......... H04n 1/36, H04n 1/04
[50] Field of Search .......... 178/6BWR, 7.1, 7.3, 7.6, 7.7

[56] References Cited

UNITED STATES PATENTS 3,284,568 11/1966 Cook .......... 178/7.6
3,398,237 8/1968 Paidosh .......... 178/7.7
3,447,852 6/1969 Barlow .......... 178/7.6

*Primary Examiner*—Robert L. Griffin
*Assistant Examiner*—Howard W. Britton
*Attorneys*—Frank A. Steinhilper, Ronald Zibelli and James J. Ralabate

ABSTRACT: A facsimile scanning system utilizing a feedback system to drive the scan drum combined with a stepping motor to index between scan lines. In conjunction with an adaptive bandwidth compression technique, a mechanical feedback system is utilized for drum and reciprocal mirror synchronization. Where the stepping rate is a function of the document complexity, a stepping motor is provided for stepping the drum for lines of variable information density detected on the document. The scanning mirror and the drum are geared together through a gear train which tends to rotate the scan line on the drum surface without relative motion between the optical scan line and the actual image on the drum surface.

PATENTED FEB 2 1971 3,560,651

SHEET 1 OF 2

INVENTOR.
CHARLES T. ROTH
BY Ronald Zibelli
Franklyn C. Weiss
ATTORNEYS

INVENTOR.
CHARLES T. ROTH
BY Ronald Zibelli
Franklyn C. Weiss
ATTORNEYS

MECHANICAL FEEDBACK FOR FACSIMILE SCANNING SYSTEM

BACKGROUND OF THE INVENTION

In a normal facsimile system, a document to be transmitted is scanned at a transmitting station to convert information on the document into a series of electrical signals. These video signals, or carrier modulated signals corresponding thereto, are then coupled to the input of a communication link interconnecting the transmitter with a receiver. At a receiving location, the video signals, in conjunction with suitable synchronizing signals, selectively control the actuation of appropriate marking means to generate a facsimile of the document transmitted.

One such facsimile system is disclosed in the Huber et al. U.S. Pat. No. 3,149,201, issued Sept. 15, 1964, and assigned to the same assignee as the present application. The patented invention relates to a facsimile system wherein an original document is scanned by a light spot from a cathode ray tube, reflected light from the document scanned is translated into electrical picture signals by a photomultiplier tube, the electrical picture signal is transmitted to a remote location through transmitting facilities such as common carrier channels, coaxial cables or microwave relay equipment and is translated into a facsimile of the original document by applying the signal to a cathode ray tube in the optical system of a xerographic reproducing machine. This facsimile system is manufactured and marketed by the Xerox Corporation in Rochester, New York, and is known as the LDX or Long Distance Xerography facsimile system.

Such a facsimile system as described in the preceding paragraph is capable of transmitting normal 8½ × 11 inches documents, such as a typewritten letter, to a remote location at the rate up to approximately 8 documents per minute. In order to transmit the amount of information on the normal document at this rate, the transmission medium must be of a large bandwidth capability in order to transmit the amount of information necessary for accurate reproduction of the document at the receiving location. With the use of such a high transmission rate, the cost of the transmission medium becomes a large factor in the overall cost of such a system. Since the cost of the transmission medium itself is normally a fixed amount, in order to decrease the transmission cost per copy more information is required to be transmitted per unit time. As a transmission medium has a maximum limit on the amount of information that is capable of being transmitted over such a line, the information transmitted must be made to represent more information.

One technique in increasing the amount of information transmitted through a fixed bandwidth transmission medium is by the use of the technique known as bandwidth compression. This technique includes the encoding of the information prior to transmission, which is decoded at the receiving location to obtain the original information. Such a bandwidth compression technique could increase the amount of information transmitted over a fixed bandwidth transmission medium and thus allow a manyfold increase in the number of documents which can be transmitted per unit time.

In the system described in the above mentioned Huber U.S. Pat. No. 3,149,201, at the receiving location a cathode ray tube is utilized as a flying spot scanner to reproduce the transmitted information. The image is reflected by a mirror through a lens to a xerographic drum where a latent image of the transmitted document is formed. After development by the normal xerographic principles well known in the art, the image can be presented to a record sheet for final viewing and examination of the document. With the use of bandwidth compression, however, the presentation of information to the cathode ray tube and thus the xerographic drum may not occur in equal periods of time as different lines of information compress by different factors. As the xerographic drum would normally be rotating at a fixed rate, a slight lag in the commencement of a line of information due to the lag in decoding the line of information from a bandwidth compression decoder would cause the output document to be inconsistant in the line spacing down the page. Correlation, therefore, between the scan rate and the xerographic drum rotation speed, is necessary in order to provide a clear and undistorted document.

OBJECTS OF THE INVENTION

It is, therefore, an object of the present invention to provide an improved facsimile transmission system utilizing bandwidth compression in conjunction with a flying spot scanner.

It is another object of the present invention to correlate the scan speed and document reproduction in a facsimile reproducing system.

It is another object of the present invention to provide a feedback path between a xerographic drum and a reflecting mirror in conjunction with a facsimile scanning device.

It is another object of the present invention to correlate the scan rate and xerographic drum rotation speed in a xerographic facsimile transmission system.

BRIEF SUMMARY OF THE INVENTION

In accomplishing the above and other desired aspects, applicant has invented an improved feedback system to drive a xerographic drum combined with a stepping mirror to index between scan lines with the use of an adaptive bandwidth compression technique in a facsimile system. The disclosed invention comprises a xerographic drum driven by a variable speed motor, a deflecting mirror to deflect the scanning beam, a stepping motor to index the mirror one scan line for each line to be scanned, a mirror position sensor and a differential which connects the drum shaft, the stepping motor, and the mirror shaft together. As it is desired to have the rotation of the drum independent of the stepping rate, the mirror and drum are geared together through a gear train which tends to rotate the scan line on the drum surface without relative motion between the optical scan line and the actual xerographic image on the drum surface. Thus, as the drum is rotated, the stepping motor indexes the mirror back one line at a time toward a stabilized position. The stepping rate, in conjunction with a bandwidth compression technique is a function of the document complexity.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
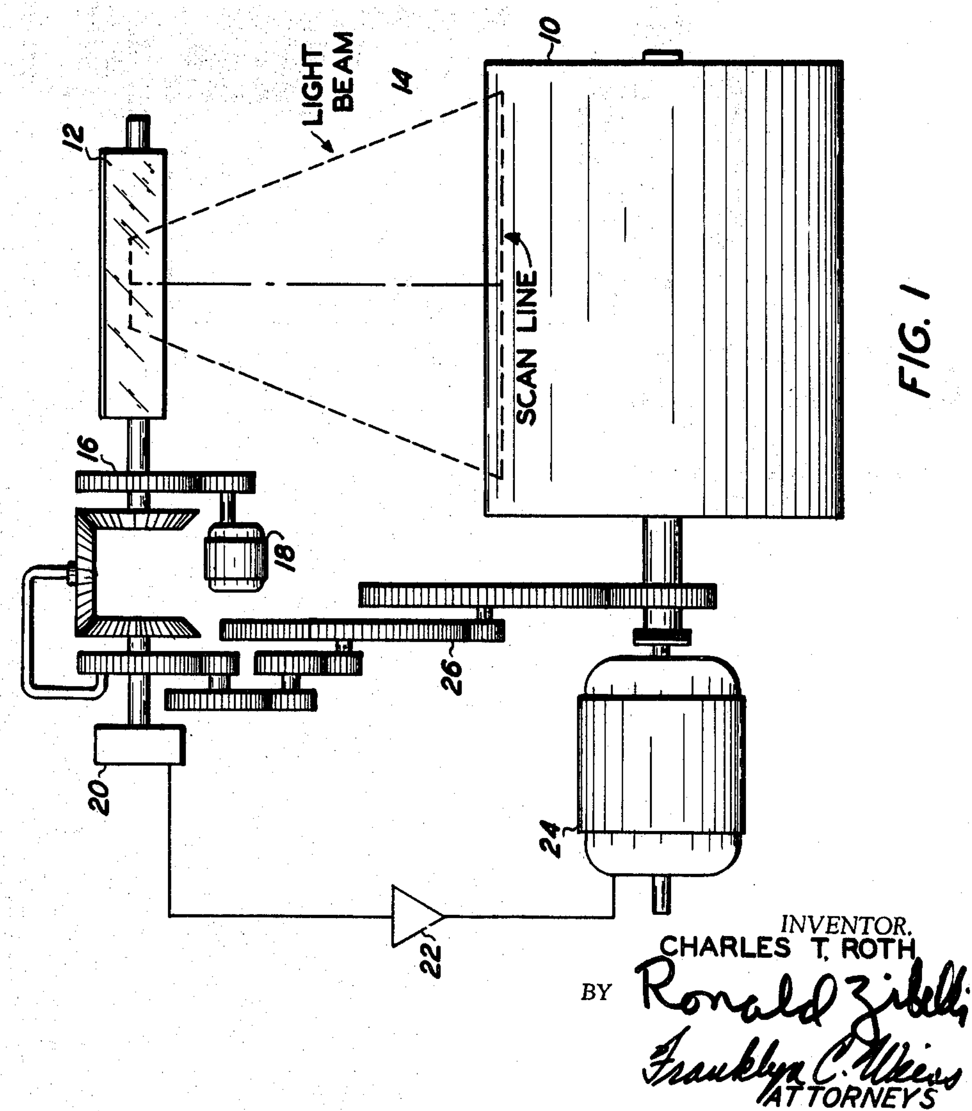
FIG. 1 is a representative diagram of the mechanical aspects of one embodiment of the present invention.

As seen in FIG. 1, xerographic drum 10 is mounted on the same shaft with variable speed motor 24. The motor 24 is driven and the speed controlled by amplifier 22 which is connected to the mirror position sensor 20. Coupled to the shaft of drive motor 24 is the gear train 26 which couples the shaft to the differential gear arrangement 16. On the main shaft of differential 16 is the reflecting mirror 12 which is used to reflect each scan line of information from a mechanical or cathode ray tube flying spot scanner onto the xerographic drum 10. Stepping motor 18 is coupled to the differential 16 in a manner to adjust the position of the mirror 16 in incremental steps.

Figure 2:
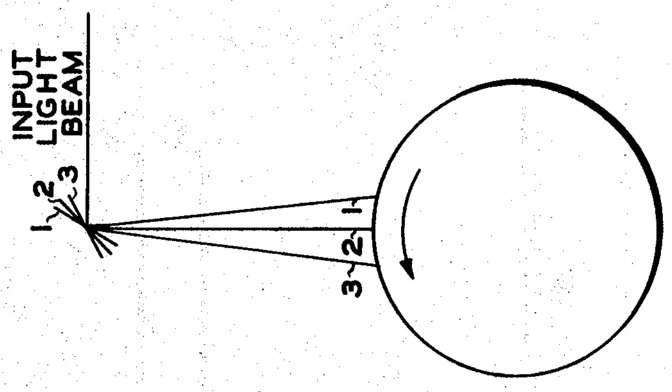
FIG. 2 is a side view of the invention set forth in FIG. 1 showing the light paths and associated mirror positions.

In a operation, a light beam from a cathode ray tube or mechanical scanner, not shown, strikes the reflecting mirror 12 and then the light beam 14 impinges upon the drum surface 10. After one line has been scanned, the stepping motor 18 indexes the mirror one line width in a direction opposite to the direction of drum rotation. As seen in FIG. 2, if the line scan just completed was in position No. 2 on the drum, the stepping motor 18 would index the mirror 12 toward position No. 1 and each successive scan line will move the line on the drum surface further towards position No. 1. Eventually, however, the mirror would be indexed out of the correct focus position if the drum 10 were stationary and not coupled through gear train 26 and differential 16 to the mirror 12. However, since it is desired to have the rotation of drum 10 independent of the stepping rate of motor 18, the mirror 12 and drum 10 are geared together through gear train 26 which tends to rotate the scan lines on the drum surface without relative motion between the optical scan line and the actual xerographic image on the drum surface. This is accomplished by means of differential gear arrangement 16.

Each time, however, that the bandwidth compression circuitry indicates the start of a new scan line, stepping motor 18 indexes one line in the direction toward position No. 1. Thus, the scan line position is slowly brought back to the optimum scan position by the rotation of the drum through the gear train 26, whereas the stepping motor 18 indexes the mirror scan position toward position No. 1. As the scan line tends to drift towards position No. 1, the mirror position sensor, seen in FIG. 1, senses a change in position of the mirror and through an amplifier increases the speed of rotation of xerographic drum 10. Thus, the scan line is brought back toward the No. 3 position.

As the scan line procedes, however, toward position No. 3 through gear train 26, the mirror position sensor 20 senses a change in position and through the amplifier 22 again slows down the drum drive motor 24. Therefore, it can be seen that when the scans are coming at a rapid rate, the scan line will tend to stabilize around the position No. 1. At moderate scan speeds or stepping rates, the scan would tend to stabilize around position No. 2 and at a very slow rates the scan would tend to stabilize around position No. 3. Positions No. 1 and 3 would, therefore, correspond with the maximum stepping rate and to the minimum stepping rate, respectively.

Figure 3:
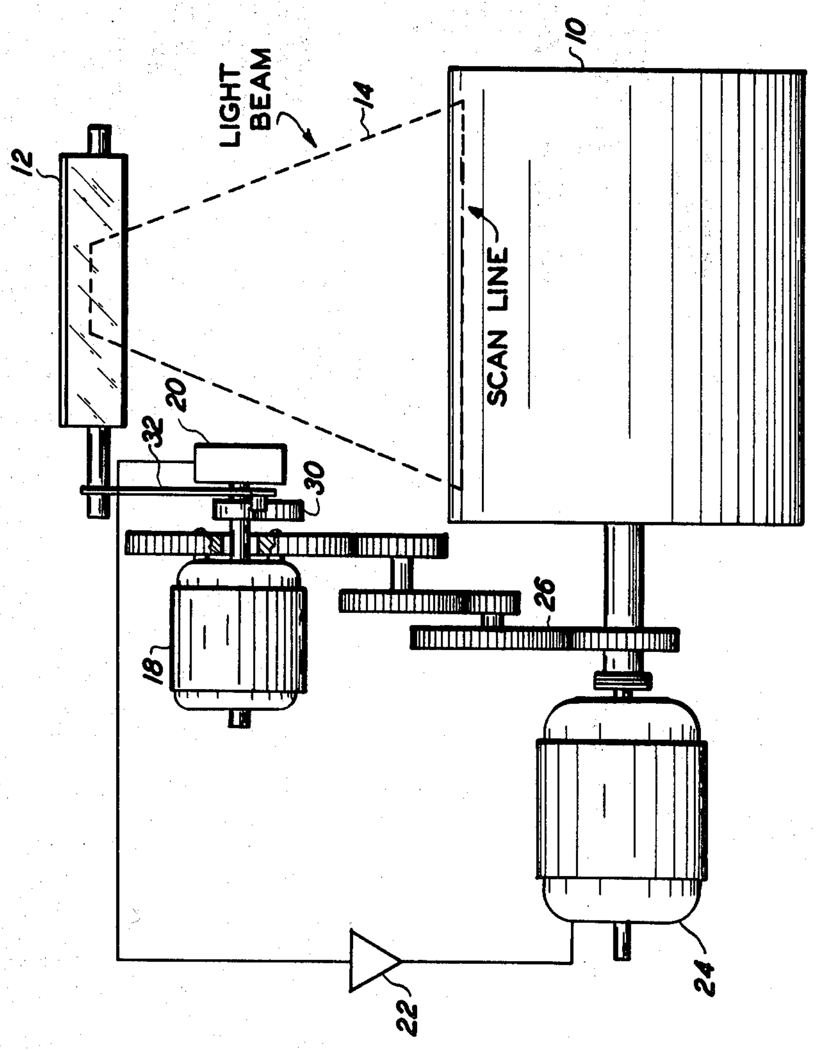
FIG. 3 is another embodiment of the invention set forth in FIG. 1.

The system as described in conjunction with FIG. 1 utilizes a gear train and stepping motor in conjunction with a differential gear arrangement. FIG. 3, on the other hand, utilizes the stator of stepping motor 18 directly mounted on the face of a gear, thereby eliminating the differential gear arrangement. This situation results in the same type of stepping action, since when the rotor of stepping motor 18 moves relative to the stator, it indexes the mirror 12 in one direction and through the gear train 26 the drum drive motor returns the stepping motor to a home position, since the stator and rotor act as a mechanical coupling. Mounted on stepper motor 18 is a cam 30 in conjunction with cam follower 32 mounted on the mirror 12 shaft to give a high reduction between the stepping motor increment and the motion of the mirror shaft, which is a very slight amount for each scan line. The feedback system, therefore, based upon the mirror position sensor 20 and amplifier 22 is the same as described hereinabove in conjunction with FIG. 1 and thus the principle of operation is preserved.

Mirror position sensor 20 could be, for example, a microswitch operated at the extreme ranges of rotation of the stepping motor 18 in FIG. 2 or the shaft upon which mirror 12 in FIG. 1 is mounted. For high speed operation mirror position sensor 20 could be a variable resistor which is electrically connected to the input of amplifier 22 for alteration of the speed of drive motor 24.

The above system has been described in conjunction with illuminating a xerographic drum upon receiving of facsimile information for reproduction of a document. The invention, however, could also be utilized in conjunction with the scanning of the original document at a transmitting location. In this instance, therefore, the light beam would be reflected off the original document onto a photomultiplier tube for conversion of the optical information into electrical signals. The electrical signals would be operated on in any of the known manners prior to presentation to the bandwidth compression circuitry for subsequent encoding. The bandwidth compression unit, upon receiving the information, would then control the operation of the systems as shown in FIGS. 1 to 3 in accordance with the principles of the present invention.

In addition, the use of a xerographic drum as the receiving medium for the light beam has been described above. However, it is obvious that a flexible web could also be utilized for carrying the document past the mirror position in both the scanning and printing functions and still retain the qualities of the present invention. With the use of the flexible web or a document carrying drum, a zinc oxide coated photoconductive paper could also be utilized in place of the xerographic coating on the drum for printout of the facsimile document. Subsequent development and fixing would also occur in the prior art manner.

Further, differential and other gear arrangements have been disclosed and described. Other devices could be utilized without deviating from the principles of the present invention, as, for example, a mechanical/electrical clutch arrangement.

Thus, while the present invention, as to its objects and advantages, as described herein, has been set forth in specific embodiments thereof, they are to be understood as illustrative only and not limiting.

I claim:

1. A facsimile graphic communication system comprising:
flying spot scanning means for scanning successive parallel line paths, the start of each of said line paths being adaptively controlled by the content of the information per scan line;
mirror means for reflecting said flying spot scan;
support means positioned to receive said reflected scan;
drive means for driving said support means in a direction transverse to the direction of the scan lines;
stepping means for indexing a said mirror means one scan line for each line to be scanned; and
electromechanical feedback means coupled to said drive means, stepping means, and mirror means for rotating the scan line on the surface of said support means without relative motion between the scan lines and the line on the support means, whereby as said support means is driven said stepping means indexes said mirror means toward a position in accordance with said information content.

2. The system as set forth in claim 1 further including:
sensor means coupled to said mirror means for detecting predetermined first and second limits of movement thereof; and
amplifier means coupled to said sensor means for speeding up or slowing down, respectively, said drive means in accordance with said first and second limits of movement of said mirror means.

3. The system as set forth in claim 2 wherein said electromechanical feedbacks means includes:
first gear means coupled to said drive means for imparting said motion to said mirror means; and
differential gear means coupled to said mirror means and said first gear means, said mirror means moving in response to said drive means and said stepping means.

4. The system as set forth in claim 3 wherein said support means is a xerographic drum upon which a latent image of a document or the like is formed by said flying spot scan.

5. The system as set forth in claim 3 wherein said support means is a drum upon which an original document or the like is scanned for conversion of optical information to electrical information.

6. The system as set forth in claim 3 wherein said support means is a flexible web upon which is an original or blank record member for transmitting or reproducing, respectively, the contents of an original document or the like.

7. The system as set forth in claim 2 wherein said electromagnetic feedback means includes:
gear means coupled to said drive means for imparting said motion to said mirror means; and said stepping means mounted on a selected gear in said gear means for indexing said mirror means.

8. A facsimile graphic communication system comprising:

scanning means for scanning successive parallel lines on a document or the like;

support means for advancing said document in a transverse direction past said scanning means;

variable speed drive means for driving said support means;

stepping drive means for indexing said scanning means one scan line for each line to be scanned; and means coupled to said variable speed drive means and said stepping drive means for rotating the scan line on the surface of said document without relative motion between the scan line and the image on said document, whereby as said support means is rotated said stepping drive means indexes said scanning means toward an essentially stabilized position.